Sept. 10, 1940.    R. E. OLSON    2,214,175
CONTROL OF PASTEURIZING SYSTEMS AND THE LIKE
Filed April 4, 1940
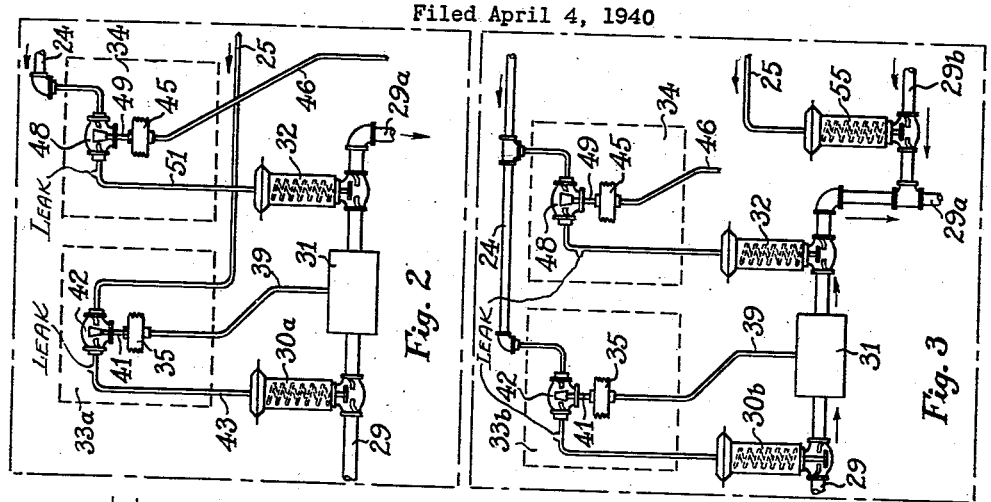
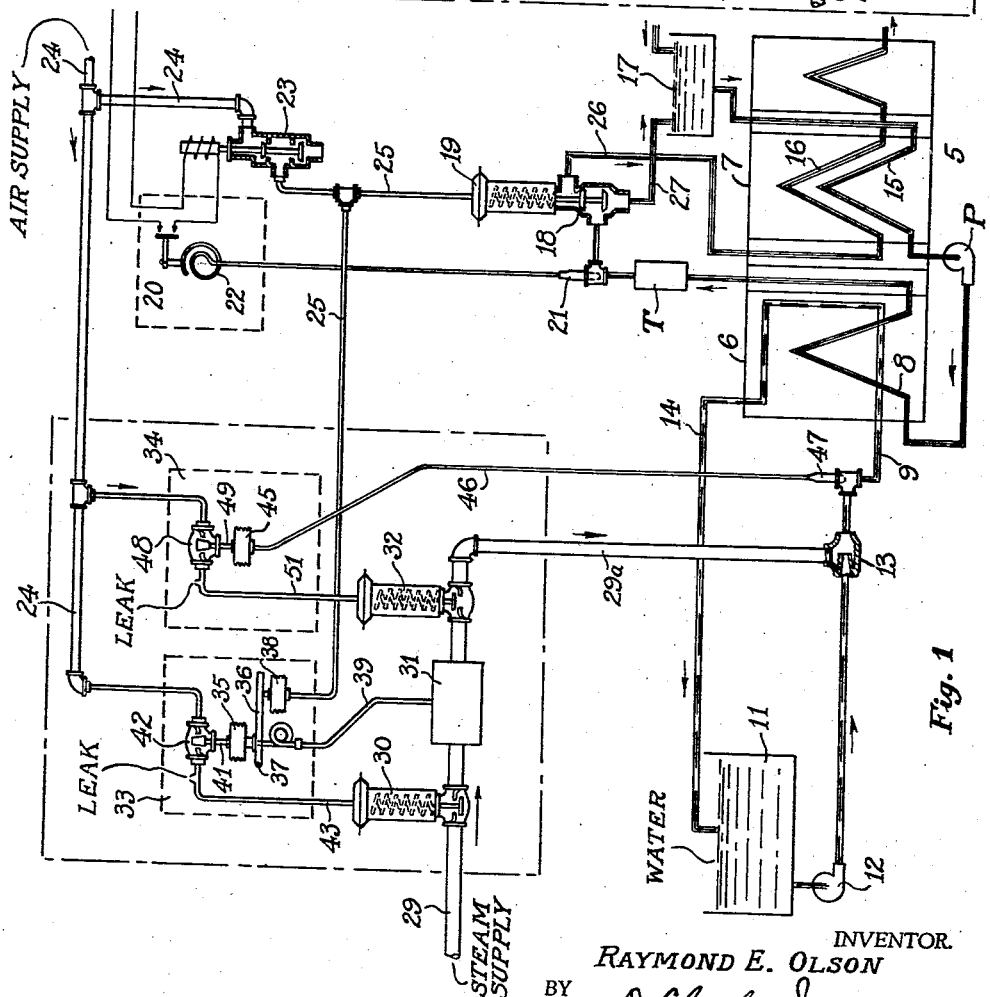
INVENTOR.
RAYMOND E. OLSON
BY D. Clyde Jones
ATTORNEY.

Patented Sept. 10, 1940

2,214,175

UNITED STATES PATENT OFFICE 2,214,175

CONTROL OF PASTEURIZING SYSTEMS AND THE LIKE

Raymond E. Olson, Pittsford, N. Y., assignor to Taylor Instrument Companies, Rochester, N. Y., a corporation of New York Application April 4, 1940, Serial No. 327,865

7 Claims. (Cl. 257—2)

This invention relates to the control of pasteurizing systems and the like.

In the patent to Olson No. 1,977,738, granted October 23, 1934, there is disclosed a pasteurizing system in which the heating of the milk or other liquid is controlled jointly by regulating the flow of steam to the heater and by regulating the pressure of the steam supplied, the regulation of pressure and flow being effected in response to variations in the temperature prevailing in the heater. By this arrangement compensation is effected for wide variations in the load on the system, where the load variations arise from sudden changes in the temperature of the liquid being treated, or from sudden changes in the rate of the flow of the liquid through the pasteurizer. It has been found that more satisfactory regulation is effected if relatively low pressure steam is supplied to the heater, since this permits the use of a high sensitivity regulating instrument without the danger of having the instrument "hunt." However, where such low pressure steam is supplied to a continuous pasteurizer of the flow diversion type, the initial "heating up" period of the pasteurizer as well as the period of restoration of the pasteurizing temperature following a diversion of improperly pasteurized milk, is rather prolonged.

The main feature of the present invention, therefore, relates to means for automatically increasing the pressure of steam supplied to the heater of a pasteurizer of the flow diversion type, whenever the treated milk is below that prescribed temperature and is consequently diverted for further heating.

Various other features and advantages will appear from the detailed description and claims when taken with the drawing in which Fig. 1 diagrammatically illustrates a pasteurizing system in accordance with the present invention; Fig. 2 and Fig. 3 are modified arrangements which can be substituted for the parts shown within the dot and dash line rectangle of Fig. 1.

Referring to the drawing, the reference character 5 generally designates a combined pasteurizing unit 6 and a regenerating unit 7. In the pasteurizing unit the milk or other liquid to be pasteurized, flows through a set of coils or plates 8 in heat exchange relation to a set of heating coils or plates 9 through which there is recirculated, water maintained at slightly above the pasteurizing temperature. The water recirculating system includes a surge tank 11 from which the water is circulated by the pump 12 through a mixing T 13, thence through the heating coils 9 of the pasteurizer and the pipe 14, back to the surge tank.

The regenerator unit includes two sets of coils or plates 15 and 16 in heat exchange relation through one set of which, such as 15, the raw milk from the tank 17 is pumped by the pump P to the milk coils or plates 8 of the pasteurizer. The other set of coils or plates 16 of the regenerator conduct the pasteurized milk from the pasteurizer into heat exchange relation to the raw milk in the set of coils or plates 15, thereby serving to cool the pasteurized milk to partially heat the raw milk. The milk flowing from the pasteurizer passes into a suitable holding tube T where it is held for the required fifteen-second holding interval in so-called short-time pasteurization and then passes into the flow diversion valve 18.

This flow diversion valve 18 which may be of the general construction disclosed in the Karst application, Serial No. 269,437, filed April 22, 1939, is of the pneumatically operated type, having a diaphragm motor top 19 which actuates the valve stem against the action of a spring to properly position the valve. An electric contact thermometer 20 which has its thermosensitive element 21 positioned in the milk flowing to the inlet of the diversion valve 18, is of such construction that when the temperature at the thermosensitive element 21 is at the predetermined or pasteurizing temperature, the Bourdon spring 22 of the controller closes an electrical circuit for operating a solenoid valve 23. This valve, when operated, in turn supplies compressed air from the supply conduit 24 to the conduit 25 and thence to the motor top 19 of the flow diversion valve 18 for moving the same to its forward flow position. With the valve 18 thus opened, the pasteurized milk from the tank T flows through the pipe 26 to the coils or plates 16 of the regenerator unit and thence to a suitable surge tank (not shown), or to a bottling machine. However, when the milk at the inlet to the diversion valve 18 is below the predetermined temperature, the Bourdon spring 22 of the electric contact controller will respond to open the above-described circuit of the solenoid valve 23. The valve 23 will be closed in this way to cut off the supply of compressed air from the conduit 25 leading to the top of the diversion valve. The spring of this diversion valve then operates to move its valve disks so that the improperly pasteurized milk is diverted through the pipe 27 to the milk supply tank 17. From this tank the improperly pasteurized milk flows again through the pasteurizer unit 6 for further treatment.

It has been mentioned that the milk in the pasteurizer unit 6 is heated by recirculating water maintained at the predetermined pasteuring temperature. This recirculating water is heated by steam flowing from the supply pipe 29 through the controlling valve 30, steam capacity chamber 31, controlling valve 32, pipe 29a and through the mixing T 13 into the circulating system. The pneumatically operated valve 30 is adjusted under the control of a reset pressure controller 33 and serves to vary the pressure of the steam supplied to the inlet port of the valve 32. However, the valve 32 is adjusted under the control of a temperature controller 34 and serves to vary the flow of steam into the recirculating water.

The reset pressure controller 33 includes a bellows 35 mounted on a lever 36 which is pivoted at one end at 37. The other end of this lever rests on a bellows 38 which communicates with the conduit 25. The interior of the capsular bellows 35 communicates through the conduit 39 with the steam chamber 31. Thus variations in the pressure of the steam in the steam chamber 31 causes the capsular bellows 35 to expand and contract accordingly, while the bellows 38 resets the pressure at which the controller maintains the steam pressure in chamber 31. The valve stem 41 of a relay valve 42 engages the upper surfaces of the bellows 35 so that the valve is adjusted in accordance with the expansion and contraction of the bellows 35. The inlet port of the valve 42 is connected to the compressed air supply conduit 24, while the outlet port of the relay valve 42 communicates through the conduit 43 with the diaphragm top of the valve 30.

The temperature controller 34 is provided with a tube system including a metal bellows 45, the capillary tube 46 and a thermosensitive bulb 47 to project into the circulating water. The tube system includes a thermosensitive medium which may be mercury, or a vaporizable liquid and its vapor. A relay valve 48 has its valve stem 49 projecting into engagement with the upper surfaces of the bellows 45. Thus as the temperature of the recirculating water increases, the medium in the tube system expands to cause the bellows 45 to expand in like manner. The expansion of this bellows forces the valve stem of the relay valve 48 in a position to open this valve so that compressed air from the conduit 24 flows through the valve, thence through the conduit 51 to the top of the motor diaphragm valve 32 causing this valve to close and reduce the amount of steam supplied to the water.

In the operation of the system, there will be a period at the beginning of the pasteurization when the milk in the pasteurizer is below the required legal temperature. The thermosensitive element 21 of the electric contact thermometer will thus be subjected to a temperature lower than that required. Consequently, this thermometer will hold open the circuit of the solenoid valve 23 and thereby prevent the flow of compressed air from the supply conduit 24 to conduit 25. The spring of the flow diversion valve 18 will thus hold this valve in a position to divert the milk discharged from the pasteurizer so that it flows through the pipe 27 into the milk supply tank 17. Since the supply of air is cut off from the conduit 25 by the action of the solenoid valve, the bellows 38 will contract and thereby cause the lever 36 to swing in a clockwise direction. This permits the valve stem 41 to move to a position to open the relay valve 42 so that compressed air will be admitted to the conduit 43 leading to the top of the motor diaphragm valve 30. The valve 30 thus opens and increases the pressure of the steam supplied to the steam chamber 31. Also, since the milk being treated is below the required temperature, heat will be rapidly transferred from the circulating water to the milk with the result that the temperature of the water will be below the required temperature. The thermosensitive element 47 of the temperature controller will respond and the relay valve 48 will be closed to reduce the amount of compressed air supplied through conduit 51 to the diaphragm motor of the valve 32. Since this valve is of the direct acting type, its spring will tend to increase the valve opening thereby permitting a greater amount of steam to flow from the pipe 29 into the recirculating water.

However, when the milk has been heated to the proper pasteurizing temperature, the thermosensitive element 21 which extends into the milk actuates the electric contact thermometer 20 and this thermometer closes a circuit for operating the solenoid valve. The operation of this valve permits compressed air from the supply conduit 24 to flow into the conduit 25 and thence to the top 19 of the flow diversion valve 18. This valve operates to cause the milk from the pasteurizer to flow at this time through the pipe 26 and through the regenerator coil or plate 16 to a suitable tank or bottling machine (not shown). The increased air pressure in the conduit 25 also expands the bellows 38 of the pressure controller, thereby moving the lever 36 in a counterclockwise direction. This movement elevates the bellows 35 thereby elevating the valve stem 41 tending to close the relay valve 42. The closure of this valve reduces the compressed air in the conduit 43 leading to the top of the motor valve 30. The spring of this valve thus tends to close it and thereby reduce the pressure of the steam supplied from the steam chamber 31.

If for any reason the temperature of the milk discharged from the pasteurizer is below the legal temperature, the electric contact thermometer 20 will be opened in the manner previously described to close the solenoid valve. This, in turn, cuts off compressed air to the flow diversion valve so that its spring moves it into the diverting position. The decreased pressure in the conduit 25 contracts the bellows 38 to reset the controller and again increases the pressure of the steam supplied through the steam chamber 31. In this way, during the initial heating period and also during the period when milk is being diverted because it is below the pasteurizing temperature, the controller 33 will supply steam at increased pressure to the steam chamber 31. In this way the duration of these periods will be reduced but when the milk is at the pasteurizing temperature, the steam pressure will be reduced so that a high sensitivity controller can be used without danger of "hunting."

A modified form of the invention comprises a system similar to that shown in Fig. 1 except that the steam pressure control means of Fig. 2 is substituted for the portion of Fig. 1 enclosed by the dot and dash rectangle. In both arrangements, however, the pressure of steam supplied to the recirculated water is controlled in accordance with the operation of the flow diversion valve 18. In the arrangement of Fig. 2 the controller 34 operates in response to change in the temperature of the heating water at the thermosensitive bulb 47. This controller functions to adjust the valve 32 which governs the flow of steam to pipe 29a and to the water circulating system. However, the pressure of the steam supplied to the water system is governed by the valve 30a under the control of the controller 33a. It will be noted that valve 30a is of the type that remains open except when compressed air is supplied to its motor top. This controller is not of the automatic reset type since its bellows 35 remains in any given position of manual adjustment. Thus the bellows responds to the pressure of the steam in the chamber 31 to position the stem 41 of the valve 42 accordingly.

As long as the milk is at the legal temperature, the solenoid valve 23 will supply compressed air to conduit 25 and thence to the top 19 of the flow diversion valve to hold this valve in the forward flow position. At this time compressed air is also supplied through conduit 25 to the inlet port of the relay valve 42. Valve 42 under the control of bellows 35 throttles the air supplied to the motor of valve 30a which changes the pressure of the steam supplied to chamber 31.

When the temperature of the milk drops below the legal value, the solenoid valve 23 cuts off the supply of compressed air from conduit 25 with the result that the flow diversion valve moves to its diverting position. With the air supply cut off from the conduit 25, there will be no compressed air applied to the diaphragm motor of the steam pressure controlling valve 30a irrespective of the adjustment of the relay valve 42, under the control of the bellows. Consequently the spring of the valve 30a will completely open this valve to increase the pressure of the steam supplied to the chamber 31.

Also the system of Fig. 1 can be modified by substituting the arrangement of Fig. 3 for the portion of Fig. 1 enclosed within the dot and dash rectangle.

In the arrangement of Fig. 3, the controller 33b with the motor diaphragm valve 30b, serves to maintain a given steam pressure in the chamber 31 at all times, while the controller 34 and its motor diaphragm throttle the flow of steam through pipe 29a in accordance with the temperature of the heating water. However, in the modification shown in Fig. 3, a supplemental steam supply is connected by the pipe 29b to the steam pipe 29a. The flow of supplemental steam through pipe 29b is governed by the motor diaphragm valve 55. This valve is of the type that is opened by its spring when no compressed air is applied to its diaphragm top.

In this arrangement when the milk is at the legal temperature, compressed air will be supplied through conduit 25 to position the flow diversion valve in its forward flow position. Compressed air in the conduit 25 is also supplied at this time to the motor of valve 55 which closes to cut off the supply of supplemental steam. When, however, the temperature of the milk drops below the legal value, compressed air will be cut off from the conduit 25 by the solenoid valve 23. This results in the setting of the flow diversion valve 18 in its diverting position. With compressed air cut-off from the conduit 25, the spring of the valve 55 opens this valve so that the supplemental supply of steam is introduced through pipe 29b into pipe 29a. This, of course, introduces more heat into the heating water in a given interval of time so that the flow diversion valve is in its diverting position for shorter intervals.

I claim:
1. In apparatus of the class described, a heat exchanger including a first passage for a liquid to be heated and a second passage in heat exchange relation thereto for a heating medium, a circulating system including said last-mentioned passage, a steam supply pipe, means responsive to the temperature of the medium for varying the flow of steam from said supply pipe to said system, means normally maintaining said steam supply at a predetermined pressure, means including a flow diversion valve adjustable to one position for discharging liquid from said first passage and adjustable to another position for diverting said liquid to flow again through said passage, and means responsive to a certain range of temperature of said liquid for adjusting said flow diversion valve to its diverting position and for increasing the pressure of steam issuing from said steam supply pipe.

2. In apparatus of the class described, a heat exchanger including a first passage for liquid to be heated and a second passage in heat exchange relation thereto for a heating medium, a circulating system including said last-mentioned passage, a steam supply, means responsive to the temperature of the medium for varying the flow of steam from said supply pipe to said system, a steam pressure controller having an adjustable set point for normally maintaining said steam supply at a predetermined pressure, means including a flow diversion valve adjustable to one position for discharging liquid from said first passage and adjustable to another position for diverting said liquid to flow again through said second passage, and means responsive to a certain range of temperature of said liquid for adjusting said flow diversion valve to its diverting position and for automatically resetting said controller to a higher controlling pressure.

3. In apparatus of the class described, a heat exchanger including a passage for liquid to be heated and a second passage in heat exchange relation thereto for a heating medium, a circulating system including said last-mentioned passage, means responsive to variations in the temperature of the medium for introducing heat therein to maintain the temperature of the medium at a given value, means including a flow diversion valve adjustable to one position for discharging liquid from said first passage and adjustable to another position for diverting said liquid to flow again through said first passage, and means responsive to a certain range of temperature of said liquid for adjusting said flow diversion valve to its diverting position and for supplying additional heat to said medium.

4. In apparatus of the class described, a heat exchanger including a passage for liquid to be heated and a second passage in heat exchange relation thereto for a heating medium, a circulating system including said last-mentioned passage, a steam supply and a pipe connected thereto, means responsive to the temperature of the medium in said second passage for varying the flow of steam from said supply pipe to said system, a steam pressure controller having pneumatically adjustable set point mechanism for normally maintaining said steam supply at a predetermined pressure, means including a flow diversion value adjustable to one position for discharging liquid from said first passage and adjustable to a second position for diverting said liquid to flow again through said first passage, a source of compressed air, and means responsive to a certain range of temperature of said liquid for adjusting said flow diversion valve to its diverting position and for supplying compressed air from said source to said automatic set point mechanism whereby said controller is adjusted to a higher set point pressure value.

5. In apparatus of the class described, a heat exchanger including a first passage for liquid to be heated and a second passage in heat exchange relation thereto for a heating medium, a heat circulating system including said last-mentioned passage, a steam supply and a pipe connected thereto, means responsive to the temperature of the medium for varying the flow of steam from said supply pipe to said system, a steam pressure controller normally maintaining said steam supply at a predetermined pressure, said controller having pneumatically-operated set point mechanism operable to maintain said steam at a higher pressure value, means including a flow diversion valve adjustable to one position for discharging liquid from said passage and adjustable to a second position for diverting said liquid to flow again through said first passage, a source of compressed air, and means responsive to a certain range of said liquid for adjusting said flow diversion valve to its diverting position and for supplying compressed air to said pneumatically operated set point mechanism.

6. In apparatus of the class described, a heat exchanger including a first passage for liquid to be heated and a second passage in heat exchange relation thereto for a heating medium, a heat circulating system including said last-mentioned passage, a steam supply and a pipe connected thereto, means responsive to the temperature of the medium for varying the flow of steam from said supply pipe to said system, a steam pressure controller normally maintaining said steam supply at a predetermined pressure, said controller having pneumatically-operated set-point mechanism for maintaining said steam at a higher pressure value, means including a pneumatically-operated flow diversion valve adjustable to one position for discharging liquid from said passage and adjustable to a second position for diverting said liquid to flow again through said first passage, a source of compressed air, and means responsive to a certain range of temperature of the liquid in said first passage for applying compressed air to said flow diversion valve to adjust it to its diverting position and for supplying compressed air to said pneumatically-operated set point mechanism.

7. In apparatus of the class described, a heat exchanger including a passage for liquid to be heated and a second passage in heat exchange relation thereto for a heating medium, a circulating system including said last-mentioned passage, means responsive to variations in the temperature of the medium for introducing heat therein, means including a flow diversion valve adjustable to one position for discharging liquid from said first passage and adjustable to another position for diverting said liquid to flow again through said passage, and means responsive to a certain range of temperature of said liquid for adjusting said flow diversion valve to its diverting position and for increasing the rate of heat transfer between said medium and said liquid.

RAYMOND E. OLSON.